J. W. Ells,

Cruet Stand.

No. 111,920. Patented Feb. 21, 1871.

Witnesses
J. B. Whaley
Geo. C. Stewart

Inventor
Josiah W. Ells

UNITED STATES PATENT OFFICE.

JOSIAH W. ELLS, OF PITTSBURG, PENNSYLVANIA.

IMPROVEMENT IN CRUET-STANDS.

Specification forming part of Letters Patent No. 111,920, dated February 21, 1871.

*To all whom it may concern:*

Be it known that I, JOSIAH W. ELLS, of Pittsburg, in the county of Allegheny and State of Pennsylvania, have invented an Improved Cruet-Stand, of which the following is a specification.

The nature of my invention consists in making a complete cruet-stand of a single piece of glass, by pressing it to the required shape while in a molten or plastic condition, in a properly-constructed mold—that is to say, making the plate with its flange, central support, and handle of one piece, the said plate having receptacles for the cruets or bottles, and the flange extending around and below the edge of such plate to form a stand, and as a means of adding strength thereto.

Figure 1:
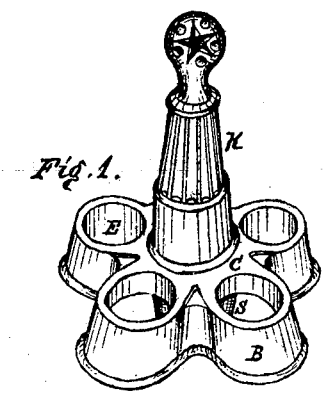
Figure 2:
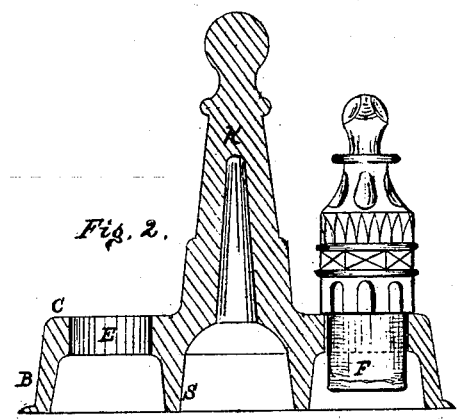
Figure 3:
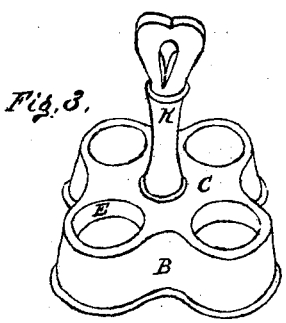
Figure 4:
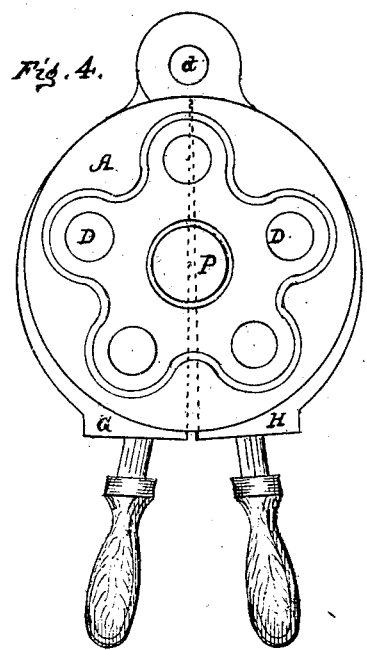
Figure 5:
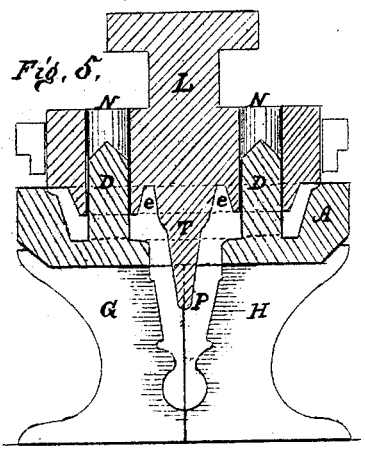

In the accompanying drawings, Figure 1 represents a perspective view of a complete cruet-stand formed of a single piece of glass; Fig. 2, a transverse vertical section of the same; Fig. 3, perspective view of a four-bottle stand; Fig. 4, top view of the mold, with plunger removed; Fig. 5, transverse vertical section of the mold and plunger.

For the purpose of making a cruet-stand complete by one operation and of a single piece of glass, I first construct a metallic mold in three sections, exclusive of the plunger, the upper section, A, of which is shaped to the exact external form required for the flange B and plate C, and with a series of raised studs, D. Below this upper part A the mold is divided vertically into sections, G H, hinged together and to the upper part of a pivot, $d$, so as to admit of being opened and closed horizontally in this portion of the mold, and on the line of its separation a vertical recess, P, is made, and which may be carved to any ornamental shape or design required for the handle K. To this mold is fitted a plunger, L, which coincides in form to that part of the cruet-stand underneath the plate C and inside of the flange B. This plunger is provided with a series of vertical holes, N, corresponding in size, number, and position to the studs D in the mold, and so arranged with relation thereto as that when the plunger is pressed down these several studs enter each its appropriate hole, and by which bottomless receptacles E are made in or through the plate C for the cruets F. The plunger is also furnished with a long tapering core, T, around the base of which is an annular groove, $e$, of a depth corresponding to that of the flange B, to allow the glass to rise and form a central circular support, S, for the plate C.

The mold being constructed as described, and a sufficient quantity of molten glass poured in, the plunger L is pressed down, forcing the glass into the proper recess which corresponds to the shape of a finished cruet-stand, causing it to fill the mold completely. When this is accomplished, the plunger is raised above the studs and the lower portion of the mold opened to release the handle K. The glass may then be readily removed.

I claim—

As a new and improved article of manufacture, a complete cruet-stand made of a single piece of glass—that is to say, the plate C, with bottomless receptacles E for the cruets, surrounding flange B, central support, S, and handle K, of one piece of glass, by pressing it to such shape while in a molten or plastic condition in a mold, substantially as shown and described.

JOSIAH W. ELLS.

Witnesses:
   J. B. WHALEY,
   GEO. C. STEWART.